Patented Nov. 16, 1948

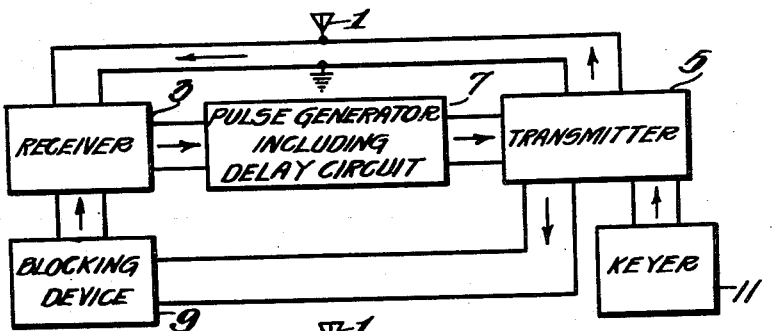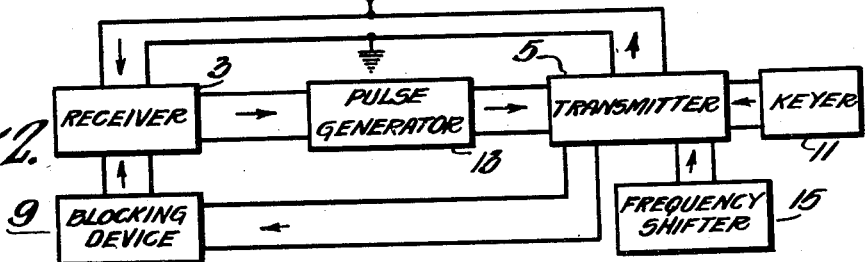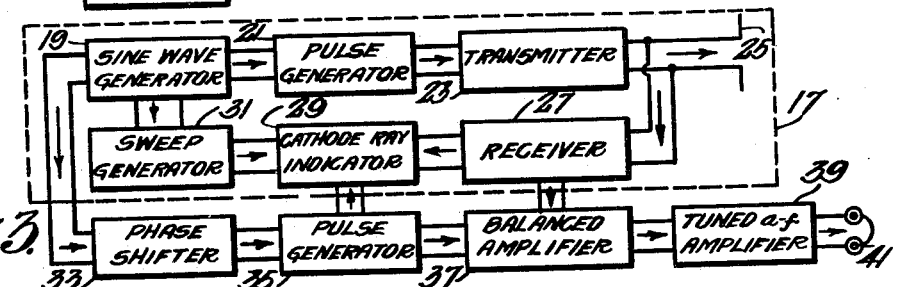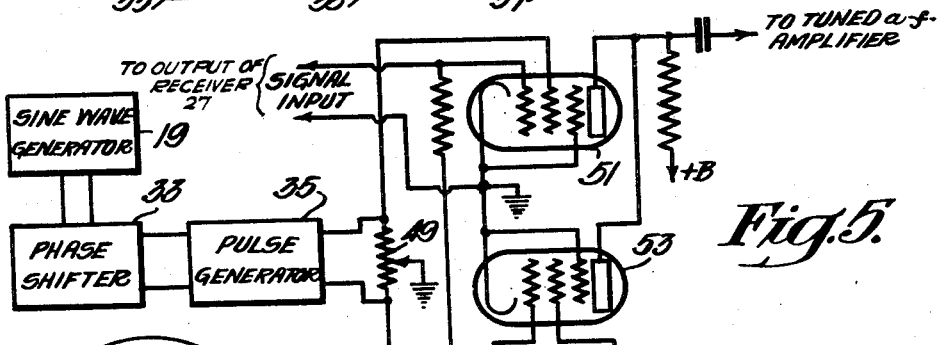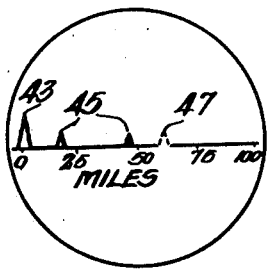

2,453,970

UNITED STATES PATENT OFFICE 2,453,970

RECOGNITION SYSTEM FOR PULSE ECHO RADIO LOCATORS

George M. Charrier, Collingswood, N. J., assignor to Radio Corporation of America, a corporation of Delaware Application May 31, 1941, Serial No. 395,924

6 Claims. (Cl. 343—13)

This invention relates to an obstacle detector recognition system and especially to a pulse echo indicating system in which certain selected objects are provided with pulse retransmission means for reradiating identifying pulses.

Obstacle detection by means of pulse transmission and reception systems are well known to those skilled in the art. In such systems, pulses are radiated at predetermined rate. A suitable indicator, operated in synchronism with the outgoing pulses, is used to indicate reflected pulses and usually the distance to the wave reflecting body. One important use of such systems is to detect the presence of enemy aircraft or surface vessels. Since both friendly and enemy craft will reflect pulses from an obstacle detection transmitter, it is desirable to be able to distinguish the reflection of pulses from friendly and unfriendly craft, according to some prearranged code.

One of the objects of the instant invention is to provide means for distinguishing between friendly and unfriendly craft operating within the range of an obstacle detecting system. Another object is to provide means whereby a craft detected by an obstacle detection system may be distinguished as friend or foe, when challenged. Another object is to provide means whereby pulses from an obstacle detecting system may be reradiated to indicate the nature of selected reflecting objects or craft according to a predetermined code.

The invention will be described by referring to the accompanying drawing in which Figure 1 is a schematic block diagram of one embodiment of the invention; Figures 2 and 3 are block diagrams of modifications of the invention; Figure 4 illustrates the type of signal indications received in a pulse echo system; and Figure 5 is a schematic circuit diagram of one of the elements of the invention. Similar reference characters indicate similar elements in the drawings.

Referring to Figure 1, an antenna 1 is connected to a receiver 3 and a transmitter 5. A pulse generator 7, preferably including a time delay network, is connected between the receiver and transmitter. The transmitter is further connected to the receiver through a blocking device 9. The transmitter may be keyed or coded by a suitable keyer 11.

The operation of the system starts when the regularly recurrent pulses from an obstacle detector are received by the antenna 1. The received pulses are detected and are applied to trigger the pulse generator 7 in which the pulses are slightly delayed (although the delay means may be included elsewhere in the system). The delayed pulse excites the transmitter, which applies the pulse to the antenna from which it is radiated. To prevent the strong outgoing pulse from paralyzing the receiver, a biasing off voltage is applied from the blocking device 9 to the receiver. The transmitter may be keyed, according to a secret code, either continuously or when challenged.

At the obstacle detecting system from which the initial pulses were received, the reflected pulses are indicated on a cathode ray tube or any suitable indicator. The signal reflections appear along a distance scale according to the time required for the pulses to travel to the reflecting object and back to the obstacle detection receiver. Thus in a conventional obstacle detecting system, the reflections from a plurality of objects at different distances are separately indicated. The retransmitted signals from a craft carrying the device described in connection with Fig. 1 will be received after the direct reflections from the craft because of the delay in retransmitting and ordinarily the retransmitted signal will be distinguishable from the reflected signal in a conventional obstacle detecting system because the retransmitted signal will be of greater amplitude. Furthermore, the retransmitted signals may be according to a prearranged secret code so that an operator at the obstacle detecting system will know from the code of the retransmitted signals that the reflected object is friendly. The nature of the obstacle detection system, which differs from the conventional system by the inclusion of the recognition devices, will be described hereinafter by referring to Fig. 3.

The circuit arrangement of Fig. 2 is similar to that of Fig. 1 with the following exceptions: The pulse generator 13 of Fig. 2 does not include a delay circuit, and the transmitter 5 includes a frequency shifter 15. The delay circuit in the preceding arrangement was used to shift the position of the recognition signals at the obstacle detector so that these signals could be distinguished from ordinary reflection signals. In the present arrangement, the frequency of the retransmitted signal is varied throughout a predetermined range so that the signals will be retransmitted on a band of frequencies and will therefore actuate any one or a number of obstacle detector receivers operating on different frequencies within said band. The means and method of distinguishing retransmitted signals from reflection signals will appear from the description of Fig. 3.

In the broken line block 17 of Fig. 3 is shown a conventional obstacle detection system which is arranged as follows: A sine wave generator 19 is connected to a pulse generator 21. The pulse generator is connected to a transmitter 23 whose output is applied to an antenna 25. The antenna may be connected to a receiver 27 or a separate antenna may be used for reception. The receiver output is applied to a cathode ray indicator 29 which is also connected to a sweep generator 31. The sweep generator 31 is synchronized with the sine wave generator and pulse amplifier so that the outgoing pulses are in turn synchronized with the sweep. Thus, the conventional system is arranged to radiate at a predetermined rate pulses which are received after reflection. The spacing of the received reflected signal pulses on the cathode ray tube screen indicates the distance of the reflecting object.

The additional receiving means for the recognition branch of the system are shown below the broken line box 17. In the recognition system, the input of a phase shifter 33 is connected to the output of the sine wave generator 19. The output of the phase shifter 33 is applied to the input of a pulse generator 35 the output of which is connected to the control electrode of the cathode ray indicator 29 and to the input of a balanced amplifier 37. The input of the balanced amplifier is connected to the output of the receiver 27 and the amplifier output is connected to the input of a tuned audio frequency amplifier 39. The output of the audio frequency amplifier is applied to telephones 41 or to any signal indicator.

The operation of the device is essentially as follows: The initial pulse 43 and reflected pulses 45, 47 appear on the cathode ray tube screen. If the operator wishes to determine whether the reflection 47 is from an obstacle or craft carrying the recognition device described by reference to Fig. 2, he first adjusts the phase shifter 33 until the pulse generator applies to the cathode ray beam a controlling voltage which may either brighten or dim the reflection signal 47 as indicated by the dotted line. Since the signals from the receiver 27 and the pulse generator 35 will then be applied simultaneously to the balanced amplifier 37, it follows that the pulse signals will pass through the amplifier 37 to the tuned audio frequency amplifier 39 and the telephones 41. If the signals in the telephones correspond to a prearranged secret code, the operator will know that the signals 47 are retransmitted from an object or craft carrying the recognition system, previously described with reference to Figs. 1 and 2, and provided with the secret code.

It will be appreciated by those skilled in the art that the balanced amplifier will not pass the received signals unless the pulse generator and the receiver simultaneously apply signals to the balanced amplifier input. Furthermore, in order that such signals may be applied simultaneously, it is necessary to adjust the phase shifter until the received signals and the signals from the pulse generator 35 exactly coincide. This coincidence is determined by the brightening or dimming of the cathode ray trace. With respect to certain aspects, the foregoing invention is an improvement of the invention disclosed in the copending application of Irving Wolff, Serial No. 395,739, filed May 29, 1941, for "Pulse recognition system."

Although the majority of the elements of the foregoing system are well known to those skilled in the art, reference is made to the Physical Review, vol. 28, September 1926, in which an article by Breit and Tuoe, entitled "A test of the existence of the conducting layer," describes a pulse echo system. A preferred method of operating the transmitter and receiver on a common antenna is disclosed in copending application Serial No. 184,354, filed January 11, 1938, now Patent No. 2,401,717, issued June 4, 1946, by Wolff and Hershberger, for "Signalling system." One form of pulse generator is described in copending application Serial No. 182,418, filed December 30, 1937, by Irving Wolff for "Apparatus and method of pulse keying," now Patent No. 2,403,624, dated July 9, 1946. A suitable phase shifter is disclosed in copending application Serial No. 196,863, filed March 19, 1939, by Irving Wolff, for "Distance and directional determination system," now Patent No. 2,407,198, dated September 3, 1946. While balanced amplifiers are known, the details of a preferred embodiment are shown in Fig. 5.

In the circuit of Fig. 5, the output of the pulse generator 35 is connected to a balancing potentiometer 49 which is used to adjust to equal amplitudes the pulses applied in push-pull to the grids of the balanced amplifier tubes 51, 53. A second set of grids are connected in parallel to form the signal input, which is the receiver 27 of Fig. 3. Any difference in tube gain may be overcome by appropriately biasing one tube or the other by means of a potentiometer 55. The output of the amplifier tubes is applied to the tuned audio frequency amplifier 39 of Fig. 3.

Thus the invention has been described as a pulse echo system in which a recognition device is arranged to retransmit signals from selected objects to distinguish these objects from others which merely reflect pulses. The retransmitted signals may be slightly delayed and made of greater amplitude so that the reflected signals and the retransmitted signals may be distinguished in an obstacle detection receiver. According to another method the retransmitted signals are varied throughout a band of frequencies so that the signals may be applied effectively to obstacle detection receivers tuned to different frequencies. When the retransmitted pulses are not delayed at the retransmission device, they may be distinguished by an additional recognition channel connected to the conventional obstacle detection receiver. In this channel, a balanced amplifier is operated by applying the received signal pulses and properly phased pulses. A suitable phase shifter permits the operator to select any desired reflection signal and to examine the signal for a secret code which identifies friendly craft. While the invention has been described by referring to radio frequency devices and radio waves, it should be understood that the invention may be applied to underwater signalling devices or other devices employing different types of wave or pulse transmission.

I claim as my invention:

1. A pulse echo system including in combination, a pulse transmitter, a pulse receiver responsive to pulses from said pulse transmitter, an indicator connected to said receiver including a distance scale indicating the reception of signals from reflecting objects and from distinctively identifiable transmitters on said objects, a balanced amplifier connected to said receiver, a phase shifter effectively connected to said pulse transmitter and a pulse generator connected to said phase shifter for establishing pulses of the same phase as a selected received echo signal, means for applying said established pulses and said selected pulses to said balanced amplifier, and means responsive to signals from said balanced amplifier for distinguishing echo signals from said distinctively identifiable transmitter signals.

2. A pulse echo system including in combination a pulse transmitter, a pulse receiver responsive to pulses from said transmitter, an indicator connected to said receiver including a distance scale for indicating the reception of signals from reflecting objects and from distinctively identifiable transmitters on said objects, a balanced amplifier connected to said receiver, a pulse generator effectively connected to said transmitter for establishing pulses at the frequency of the pulse transmitter, means connected to said pulse generator for shifting the phase of said generated pulses so that the generated pulses have the same phase as a selected received echo pulse, means for applying said established pulses and said selected pulses to said balanced amplifier, and means responsive to signals from said balanced amplifier for distinguishing echo signals from said distinctively identifiable transmitter signals.

3. The method of indicating a certain object responsive to pulse signals from a pulse echo system which includes converting the pulse signal applied to said object into a distinctively modulated pulse signal, varying the carrier frequency of said modulated signal, radiating said distinctively modulated signal, receiving pulse echo signals from all objects including said certain object within range of said system, visually indicating the distances of said objects as functions of the propagation times of said pulse echoes, and converting a selected visual indication into an aural indication for determining the presence or absence of said distinctive modulation.

4. A recognition system for a pulse echo obstacle detection system employing a pulse transmitter including in combination a second transmitter, means for receiving the pulses from said pulse transmitter, means for applying said received pulses to said second transmitter to key same, means for varying continuously the frequency of said second transmitter, and means radiating pulses from the thus keyed and frequency varied transmitter.

5. A recognition system for a pulse echo obstacle detection system employing a pulse transmitter including in combination a second transmitter, means for receiving the pulses from said pulse transmitter, means for applying said received pulses to said second transmitter to key same, means for varying continuously the frequency of said second transmitter, means for applying to said second transmitter modulations including an identification code, and means for radiating pulses from the thus keyed frequency varied and code modulated transmitter.

6. A recognition system for a pulse echo system employing a pulse receiver and a pulse transmitter, said recognition system being located on a craft that has a reflecting surface whereby pulses transmitted from said pulse transmitter are reflected back to said pulse receiver, said recognition system including a second transmitter, means for receiving the pulses from said pulse transmitter, means for applying said received pulses to said second transmitter for retransmitting said pulses, means for code modulating said second transmitter for establishing identification pulses, means for radiating said identification pulses for reception by said first pulse receiver, means for delaying the radiation of said identification pulses sufficiently with respect to said received pulses so that pulse echoes may be distinguished from identification pulses.

GEORGE M. CHARRIER.

REFERENCES CITED

The following references are of record in the file of this patent:

UNITED STATES PATENTS

| Number | Name | Date |
|---|---|---|
| 1,792,746 | Kolster | Feb. 17, 1931 |
| 2,055,883 | Terry | Sept. 29, 1936 |
| 2,134,562 | Kimmich | Oct. 25, 1938 |
| 2,134,716 | Gunn | Nov. 1, 1938 |
| 2,144,337 | Koch | Jan. 17, 1939 |
| 2,157,122 | Dunmore | May 9, 1939 |
| 2,189,549 | Hershberger | Feb. 6, 1940 |
| 2,207,267 | Plaistowe | July 9, 1940 |
| 2,212,110 | Beuermann | Aug. 20, 1940 |
| 2,252,083 | Luck | Aug. 12, 1941 |